Figure 1:
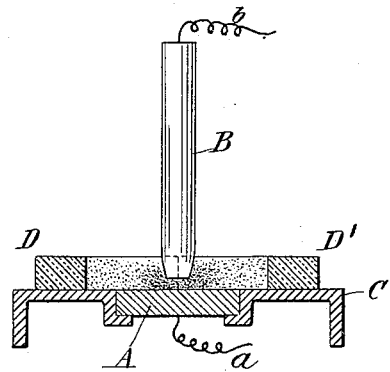

(No Model.)

W. C. CLARKE.
MANUFACTURE OF CARBIDE OF CALCIUM.

No. 552,890. Patented Jan. 14, 1896.

Witnesses:
Raphaël Netter
Sands F. Randall

William C. Clarke  Inventor
by Clarkson A. Collins Attorney.

UNITED STATES PATENT OFFICE.

WILLIAM C. CLARKE, OF NEW YORK, N. Y.

MANUFACTURE OF CARBIDE OF CALCIUM.

SPECIFICATION forming part of Letters Patent No. 552,890, dated January 14, 1896.

Application filed August 24, 1895. Serial No. 560,382. (No specimens.)

*To all whom it may concern:*

Be it known that I, WILLIAM C. CLARKE, a citizen of the United States, residing in the city of New York, in the county and State of New York, have invented certain new and useful Improvements in the Manufacture of Carbide of Calcium, of which the following is a specification.

The object of my improvements is to render more convenient and inexpensive the production of carbide of calcium, which, as is well known, may be formed by subjecting a mixture of lime and carbon to a high degree of heat in an electric furnace, the lime being decomposed and the carbon uniting with the metallic calcium to form the carbide.

In carrying my invention into effect I use an electric furnace in which the electrodes are vertically disposed to each other, and in order to prevent the excessive heating of the upper electrode which has heretofore been experienced where vertical electrodes are employed I keep the lower end of the upper electrode approximately at the level of the upper edge of the furnace-wall, so that its body is at all times above and outside of the furnace and out of contact with the material under treatment as I am enabled to do by the means hereinafter described. At the same time in order to further facilitate the formation of the carbide and its removal from the furnace I so charge the furnace with the material to be treated that only the central part of it is subjected to a decomposing temperature, the remainder being highly heated, but remaining in the granular state between the carbide formed and the furnace-wall. To these ends the lower electrode, which is preferably circular in shape and forms a portion of the bottom of the furnace, is set in a suitable bed, which may be simply a piece of sheet-iron laid upon the ground. The upper electrode is suspended above the lower in any usual or suitable manner and provided with any usual or suitable mechanism for bringing it in contact with the lower electrode and separating it therefrom when required. Around the lower electrode I loosely construct a low wall which may be done simply by placing in position two semicircular pieces or several curved pieces of tile, fire-brick or other material not readily affected by heat, so as to form a circular inclosure around and of somewhat greater diameter than the electrode. This inclosure I then fill or nearly fill with the material to be treated, consisting of pulverized lime and carbon in the proportion of substantially twenty parts of lime to twelve parts of carbon. The electrodes being brought in contact current is then turned on and upon separating the electrodes an intense heat is developed between them by which the lime is decomposed and the carbon combines with the metallic calcium, forming carbide of calcium.

When the decomposition of the material between the electrodes has been nearly or quite effected, the wall of the furnace is raised by adding another tier of the wall material, the electrodes are further separated by raising the upper one and a fresh charge of material is thrown into the furnace on top of that already treated. This process of building up the wall, separating the electrodes and adding fresh charges of material is continued until the furnace has reached as great a height as is convenient or where the resistance between the electrodes cannot be increased without inconvenience when the current is turned off. In this manner a column of carbide is built up resting on the lower electrode, which constitutes a practical extension of such electrode as the operation progresses. The material which is outside of the circumference of the electrode not being exposed to such intense heat as that immediately between the electrodes will not be decomposed, but will remain as a layer of granular material around the carbide and interposed between it and the wall of the furnace.

The loose furnace-wall is removed as soon as the carbide has sufficiently hardened, permitting the undecomposed material to fall away, when the carbide is easily removed and the operation is repeated.

By reason of the layer of granular material interposed between the wall of the furnace and the carbide, which until partially cooled is in a soft state, any sticking of the carbide to the walls of the furnace is prevented and its removal from the furnace is facilitated. By keeping the lower end of the upper electrode always near the upper edge of the furnace-wall, the hot gases generated in the furnace are permitted to escape without coming in contact with the body of the electrode, the life of which is thus prolonged.

The invention will be better understood by reference to the accompanying drawings, forming a part hereof, in which—

Figure 2:
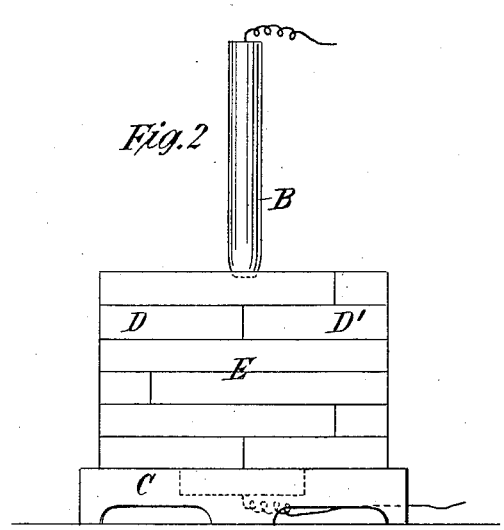
Figure 3:
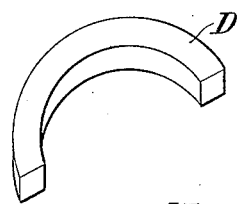

Figure 1 shows a vertical section of the furnace as it appears at the beginning of the operation. Fig. 2 is a vertical elevation of the furnace as it appears at the close of the operation; and Fig. 3 is a view in perspective of a semicircular tile or fire-brick, which may conveniently be used in building up the furnace-wall.

The same letters of reference indicate corresponding parts throughout the drawings.

A is the lower and B the upper electrode, preferably composed of carbon, which are respectively connected by conductors indicated at $a$ and $b$ with any suitable source of electricity, as a dynamo-machine. The lower electrode A is set in an opening in the base C, which may be simply a piece of sheet-iron laid upon the ground. D is one of the curved bricks or tiles, shown in the present case as forming half of a circle of which the furnace-wall is composed.

In carrying out the operation, two or more of the semicircular bricks or tiles D D' are placed in position upon the base C around the electrode A, forming a circular inclosure somewhat greater in diameter than the electrode. This inclosure is then filled with a charge of the mixture of pulverized lime and carbon to be treated, and current is caused to pass between the electrodes which are sufficiently separated so that that portion of the charge lying upon the electrode A will be subjected to a decomposing temperature. When the decomposition of this initial charge has been substantially effected, the wall of the furnace is raised by laying another tier of bricks or tiles upon the tiles D D', an additional charge of the material to be treated is thrown into the inclosure and the electrodes are still farther separated. When the mass of carbide has been built up to as great a height as is convenient, or when the electrodes have become so far separated that the resistance between them is as great as is desirable, the current is turned off, the wall E is taken down, and the carbide is removed.

It will be observed that the lower end of the upper electrode is kept at all times at or only a short distance below the upper edge of the furnace-wall, so that the hot material in the furnace does not come in contact with the body of the electrode and the hot gases set free in the process of forming the carbide are not confined around the electrode, but are free to pass away from it, and the body of the electrode is thus kept comparatively cool and its durability thereby increased.

The undecomposed layer of material between the carbide formed and the furnace-wall prevents any adhesion of the newly-formed carbide to the wall of the furnace, which is thus readily removed, and the granular material falling down as the wall is removed is ready to be again thrown into the furnace as a part of a subsequent charge. Being already highly heated it is in better condition to be treated than when put in the furnace in a cold state, so that I thus utilize the otherwise waste heat of the furnace.

As the carbide formed retains its heat for a considerable period, the removal of the hot mass from the furnace is greatly facilitated by the taking down of the furnace-wall after the formation of the carbide is completed, as the carbide will then cool more rapidly and can be easily grappled and carried away.

It is evident that the invention herein claimed can be applied to the manufacture of other material than carbide of calcium, and I therefore do not limit my claim to the manufacture of carbide of calcium alone.

What I claim as new, and desire to secure by Letters Patent, is—

1. The hereinbefore described improvement in the manufacture of carbide of calcium, which consists in building up the furnace-wall as the formation of the carbide progresses, adding fresh charges of the material to be treated as the wall is built up and keeping the lower end of the upper electrode at all times near the upper edge of the furnace wall.

2. In the process of manufacturing carbide of calcium in an electric furnace having vertical electrodes, the hereinbefore described method of preventing the heating of the upper electrode which consists in building up the furnace wall as the electrodes are separated, whereby the body of the upper electrode is kept above the furnace wall.

3. The hereinbefore described improvement in the manufacture of carbide of calcium, which consists in subjecting mingled lime and carbon to a decomposing temperature between vertical electrodes, adding fresh charges of material from time to time, as required, to continue the operation, building up a retaining wall, as required, to hold in place the material added, and finally removing such wall, substantially as and for the purpose set forth.

4. The hereinbefore described improvement in the manufacture of carbide of calcium, which consists in forming around the lower of two vertically disposed electrodes, an inclosure greater in diameter than such electrode, charging into such inclosure the material to be treated and subjecting it to a decomposing temperature by means of an electric current between such electrodes, adding fresh charges of material and separating the electrodes as required to continue the operation and building up the wall of the inclosure as required to contain the material added.

In testimony whereof I have hereunto subscribed my name this 2d day of August, A. D. 1895.

WM. C. CLARKE.

Witnesses:
   E. A. OLENDORF,
   CLARKSON A. COLLINS.